Aug. 3, 1954  R. J. EHRET ET AL  2,685,627
ELECTRIC CONTROL APPARATUS
Original Filed March 15, 1951
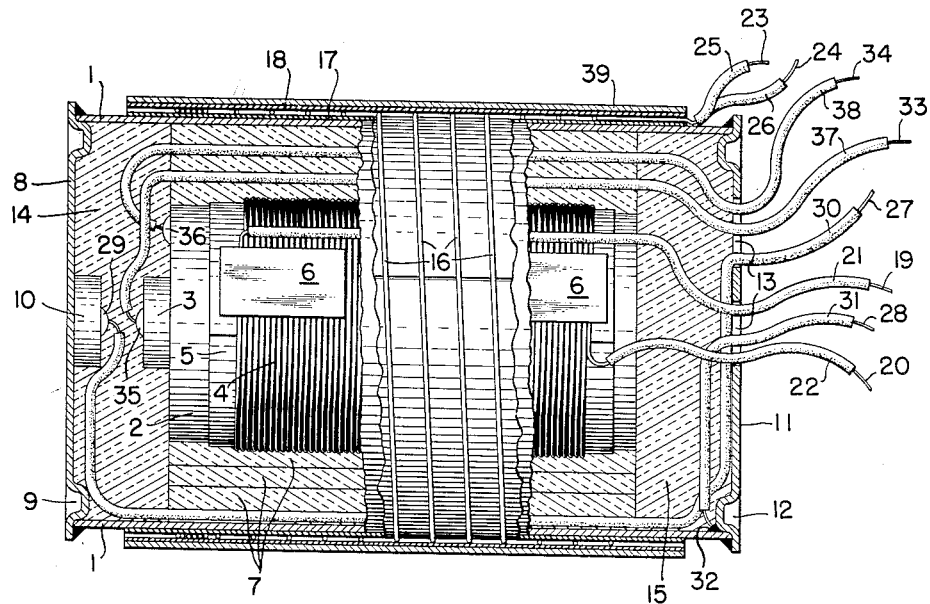
INVENTORS.
ROBERT J. EHRET
BY ROGER F. WERNLUND
ATTORNEY.

Patented Aug. 3, 1954

2,685,627

UNITED STATES PATENT OFFICE 2,685,627

ELECTRIC CONTROL APPARATUS

Robert J. Ehret, Philadelphia, and Roger F. Wernlund, Southampton, Pa., assignors to Minneapolis-Honeywell Regulator Company, Minneapolis, Minn., a corporation of Delaware Original application March 15, 1951, Serial No. 215,846. Divided and this application April 20, 1953, Serial No. 349,668

1 Claim. (Cl. 201—67)

The present invention relates generally to a control device of the thermal type, and, more specifically, relates to a thermal unit consisting of thermally related electric heaters and temperature responsive resistance elements and useful in controlling proportioning and automatic reset actions in electric control apparatus of the thermal bridge controlled time-proportioning type.

This application is a division of our prior application, Serial No. 215,846, filed on March 15, 1951. Said prior application discloses and claims electric control apparatus of the thermal bridge controlled time-proportioning type including thermal devices according to the present invention which are operative to provide desirable proportioning and automatic reset actions in the disclosed control apparatus. However, although the thermal device of the present invention has great utility in apparatus of the type disclosed in said prior application, and will be described herein, for purposes of illustration, with reference to its use in such apparatus, it should be noted that the device of the present invention has utility when used in ways which are different from the preferred embodiment disclosed by way of illustration herein, and when employed in apparatus of a character and type substantially different from that utilized herein for illustrative purposes.

It is, therefore, a general object of the present invention to provide a novel thermal device or unit of the type including thermally related electric heaters and temperature responsive resistance elements which is especially well adapted to effect proportioning and automatic reset actions in a bridge controlled time-proportioning type of electric control apparatus.

A more specific object of the invention is to provide such a thermal unit including a first electric heating element or heater which is so thermally associated with a first temperature responsive or sensitive resistance element or resistor as to cause the temperature of the latter to follow rapidly the temperature of the heater, and which is so thermally associated with a second temperature sensitive resistor as to cause the temperature of the latter to follow relatively slowly the temperature of the heater.

An even more specific object of the invention is to provide a thermal unit as just specified which also includes a second electric heater which is so thermally associated with the second resistor as to cause the temperature of the latter to follow relatively rapidly the temperature of the second heater.

A still more specific object of the invention is to provide a thermal unit of the type just specified which includes a first relatively high conductance heat coupling between the first heater and the first resistor, which includes a second relatively high conductance heat coupling between the second heater and the second resistor, and which includes a relatively low conductance heat coupling between the first heater and the second resistor.

A further, more specific object of the invention is to provide a unit as just described which includes a first member conductively associated with the first heater and first resistor but thermally insulated from the second heater and second resistor, and includes a second member of relatively high thermal inertia or capacitance or of relatively high heat capacity conductively associated with the second heater and second resistor but thermally insulated from the first heater and first resistor.

Another more specific object of the invention is to provide a unit of the type just set forth wherein the first member constitutes the relatively high conductance heat coupling between the first heater and the first resistor, wherein the second member of relatively high heat capacity constitutes the relatively high conductance heat coupling between the second heater and the second resistor, and wherein the second member, the second heater, and the second resistor are thermally insulated from the other elements of the unit by means of heat insulating material.

In the preferred embodiment of the present invention illustrated herein, the thermal unit comprises a closed, metallic, shell-like container of good thermal conductance which constitutes the aforementioned first member. A solid member of metal having a high specific heat, and constituting the aforementioned second member of relatively high heat capacity, is supported centrally within the container by heat insulating material. The aforementioned second heater is wound on the surface of this solid member, over a substantial portion thereof, and the aforementioned second resistor is mounted on the surface of the solid member in good heat transfer relationship therewith. The first resistor mentioned above is mounted adjacent the solid member on the interior of the container in good heat transfer relationship therewith, and the above mentioned first heater is wound on the exterior of the container over substantially the entire length thereof. Additional heat insulating material is located within the container to surround the solid member and the heater and resistor mounted thereon, and serves to insulate thermally the three last mentioned elements from the remainder of the elements of the unit.

The various features of novelty which characterize this invention are pointed out with particularity in the claim annexed to and forming a part of this specification. For a better understanding of the invention, however, its advantages and specific objects obtained with its use, reference should be had to the accompanying drawing and descriptive matter in which is illustrated and described a preferred embodiment of the invention.

The single figure of the drawing is a view, taken partly in section, of a preferred form of the thermal unit of the present invention.

As previously noted herein, the novel thermal unit of the present invention is well adapted for use in electric control apparatus of the bridge controlled time-proportioning type as disclosed in our aforementioned prior application. As shown and described therein, such apparatus advantageously includes a bridge circuit having a plurality of bridge circuit branches which are interconnected with the input of an electronic cycling control amplifier to cause a relay in the output thereof to energize a load circuit for cyclically repeated time periods which are proportional in length to the need for such energization as evidenced by a comparison of the value of a condition, controlled by the load circuit, and a predetermined desired value of the condition.

In the control apparatus of said prior application, one of said circuit branches includes two serially connected, temperature sensitive, follow-up resistors which are arranged to have their temperatures, and hence their resistances, inversely varied cyclically by corresponding follow-up heaters which in turn are alternately energized by said relay in such a manner as to cause the latter to provide time-proportional control as described above. Each of these follow-up resistors and its corresponding follow-up heater are thermally coupled by a relatively high conductance heat coupling, and are included in an individual one of the units of the present invention, the control apparatus thus including two such units, which may be identical. The follow-up resistor and heater of each unit as just described correspond to the first resistor and first heater of the unit previously described in general terms herein.

In order to provide desirable automatic reset functions in the control apparatus of said prior application, another of said circuit branches includes two serially connected, temperature sensitive, reset resistors which are arranged to have their temperatures, and hence their resistances, inversely varied relatively slowly by the aforementioned follow-up heaters. To this end, each of the reset resistors is included in a corresponding one of the two thermal units of the apparatus, and is thermally coupled by a relatively low conductance heat coupling to the follow-up heater of that unit. Each reset resistor thus corresponds to the second resistor of the unit previously described herein in general terms.

As described in said prior application, the reset effects obtained with the arrangement just set forth are defined as slow reset effects, and are augmented in the control apparatus by what we have termed fast reset effects. The latter are produced by the reset resistors in combination with corresponding reset heaters which are also included in the apparatus, and which are selectively energized by an electronic reset amplifier which is controlled in turn by the bridge circuit of the apparatus. Each reset heater is included in a corresponding one of the two thermal units of the apparatus, and is thermally coupled by a relatively high conductance heat coupling to the reset resistor of that unit. Each reset heater thus corresponds to the second heater of the unit previously described in general terms.

In order to obtain a desirably high time constant for changes in the temperature and resistance of each of the reset resistors resulting from changes in the temperature of the corresponding follow-up heater, the relatively low conductance heat coupling between the follow-up heater and reset resistor of each unit is supplemented by a relatively large thermal capacitance or element of high heat capacity which is thermally, conductively associated with the reset resistor and reset heater of that unit. As previously mentioned, this element of high heat capacity may well be a solid metal member on which the reset resistor of the unit is mounted, and on which the reset heater of the unit is wound.

In summary, it is noted that each of the two thermal units of the control apparatus of our said prior application may be identical to the other, and may well be of the type of the unit of the present invention. Thus, each of such units includes a first or follow-up temperature sensitive resistor which is thermally coupled to a first or follow-up heater by a first member conductively associated with the follow-up resistor and heater and constituting a path of relatively high thermal conductance between the latter two elements. Each of such units also includes a second or reset temperature sensitive resistor which is thermally coupled over a path of relatively low thermal conductance to the corresponding follow-up heater, and which is thermally coupled to a second or reset heater by a second member of relatively high heat capacity which is conductively associated with the reset resistor and reset heater, which constitutes a path of relatively high thermal conductance between the reset resistor and reset heater, and which is thermally insulated from the other elements of the unit.

As described in said prior application, the foregoing construction for the thermal units of the disclosed control apparatus enables the units to provide desirable time-proportional and reset effects in the apparatus, which effects in turn cause the apparatus to perform its time-proportional controlling function in a highly desirable and effective manner.

The preferred embodiment of the thermal unit of the present invention which is illustrated in the drawing of the present application by way of illustration is of a form which renders it well suited for use in control apparatus as described above, although it should be readily apparent that the unit may be used to advantage in any application requiring the characteristics and characteristic operation inherent in the unit.

For the purpose of relating the following description to the material set forth hereinbefore, the various elements of the thermal unit illustrated herein and now to be described will be identified as to their functions in the control apparatus of said prior application described above. It is to be understood, however, that such reference to the uses of the elements of the thermal unit of the present invention in said control apparatus is made solely for purposes of illustration, and is not made by way of limitation.

The thermal unit of the present invention in the form illustrated in the drawing comprises an outer, relatively thin metallic shell 1 of cylindrical form, preferably formed of metal having good thermal conductance characteristics. Located in the interior of the shell 1 is a solid cylindrical member 2 of a metal, such as copper, having a high specific heat. The member 2 constitutes the aforementioned member of relatively high heat capacity, and has attached to its left-hand end, as seen in the drawing, a resistor 3. The latter is shown as a negative temperature coefficient, or NTC, resistor of the disc type which is secured in good heat transfer relationship to the end of the member 2. Accordingly, the resistor 3 corresponds to the aforementioned second or reset resistor. By virtue of the construction just described, changes in the temperature of the resistor 3 are retarded by the high thermal capacity of the member 2.

A heater 4 is wound on the surface of the cylindrical member 2. The heater 4 is advantageously formed of suitable insulated wire which is closely wound over a substantial portion of the surface of the member 2. A thin wrapping of electrical insulating material 5 is interposed between the surface of the member 2 and the heater 4 wound thereon. Strips of thin electrical insulating material 6 aid in holding the heater winding 4 together on the surface of the material 5 and member 2. Thus, the heater 4 corresponds to the aforementioned second or reset heater, and the construction just described provides the aforementioned relatively high conductance heat coupling between the reset resistor 3 and the reset heater 4 through the medium of the member 2, with which both the resistor 3 and heater 4 are in good heat transfer or conductive relationship.

The entire reset unit, including the resistor 3, the heater 4, and the member 2, is centered within the shell 1, and is held in this position by layers of suitable heat insulating material 7 which are wound around the heater 4 and member 2 as shown.

The shell 1 is provided with a disc-like left-hand end closing member 8 having an annular depression 9 adjacent the disc periphery. The depression 9 engages the left-hand end of the cylindrical shell 1, and provides suitable abutting surfaces by means of which the end member 8 may be secured, as by soldering, to the shell 1.

A resistor 10 is secured to the end member 8, and is maintained in good heat transfer relationship with the member 8 and the shell 1. The resistor 10 is shown as being a negative temperature coefficient, or NTC, resistor of the disc type, and corresponds to the aforementioned first or follow-up resistor.

An end closure member 11 is provided for the right-hand end of the shell 1. The member 11 has an annular depression 12 which serves, as in the case of the left-hand end member 8, to provide a means for securing the member 11 to the shell 1. The member 11 is provided with suitable openings 13 through which pass the various conductors or leads which are connected to the elements located within the shell 1.

Additional heat insulating material 14 is located between the end member 8 and the left-hand end of the member 2, while insulating material 15 is located between the end member 11 and the right-hand end of the member 2. From this it can be seen that the entire unit including the elements 2, 3, and 4 is suitably supported in a central position within the shell 1, and is thermally insulated therefrom by the insulating material 7, 14, and 15.

A heater winding 16 is space-wound over practically the entire surface of the shell 1, and is preferably wound of insulated wire. The heater winding 16 is further electrically insulated from the shell 1 by means of a wrapping of thin electrical insulating material 17. An outer wrapping of insulating material 18 surrounds the heater 16 for mechanical protection and electrical insulating purposes. As shown, the winding of the heater 16 is advantageously bunched or concentrated in the vicinity of the resistors 3 and 10, it having been found desirable to do this in order to permit the attainment of fast cycling action in the control apparatus hereinbefore described. The heater 16 corresponds to the first or follow-up heater previously described.

By virtue of the mounting of the follow-up resistor 10 on the end member 8, and by virtue of the bonding of the member 8 to the shell 1 on which is wound the follow-up heater 16, a high conductance thermal coupling is established between the heater 16 and the resistor 10. Thus, the shell 1 and the member 8 constitute the aforementioned first member which is conductively associated with the resistor 10 and heater 16, and which forms the aforementioned relatively high conductance heat coupling between the last mentioned resistor and heater.

In the unit being described, the insulation material 7, 14, and 15 between the follow-up heater 16 and the reset resistor 3 constitutes the aforementioned relatively low conductance heat coupling between the last mentioned heater and resistor.

The end terminals of the heater 4 are connected to respective conductors 19 and 20, these conductors being covered with suitable sleeves of insulating material 21 and 22, respectively. The insulated conductors or leads 19 and 20 pass through one of the openings 13 in the end member 11 as shown. Similarly, the heater 16 is supplied with end terminal conductors 23 and 24 which are covered with respective insulating sleeves 25 and 26.

Connections to the resistor 10 are provided by a conductor 27 and a conductor 28. The conductor 27 has one end soldered at 29 to the right-hand face or terminal of the resistor 10, and is supplied with an insulating sleeve 30. The conductor 28 is provided with an insulating sleeve 31, and has one end soldered to the shell 1 and the end member 11 at 32. Since the left-hand face or terminal of the resistor 10 is also electrically connected to the shell 1 by virtue of its mounting on the end member 8, the conductor 28 is actually electrically connected to the left-hand terminal of the resistor 10. The conductors 27 and 28 and their insulating sleeves 30 and 31 pass from the interior of the shell 1 through the openings 13 in the end member 11.

Electrical connections are made to the resistor 3 by means of conductors 33 and 34. Specifically, one end of the conductor 33 is soldered at 35 to the left-hand face or terminal of the resistor 3, while one end of the conductor 34 is soldered at 36 to the left-hand end of the member 2. This causes the conductor 34 to be connected to the right-hand face or terminal of the resistor 3, due to the electrical connection formed between this terminal and the member 2 by the mounting on the latter of the resistor 3. The conductors 33 and 34 are advantageously provided with respective insulating sleeves 37 and 38, and pass through one of the openings 13 in the member 11.

The thermal unit being described is also provided with an outer metallic shell 39 which is seen to surround the unit, being electrically insulated from the heater 16 by the insulating material 18. The shell 39 contributes materially to certain desirable actions obtainable when the thermal unit is employed in the control apparatus described hereinbefore.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claim; and that in some cases certain features of the invention may sometimes be used to advantage without a corresponding use of other features.

Having now described our invention, what we claim as new and desire to secure by Letters Patent is as follows:

A thermal unit useful in time-proportioning control apparatus comprising a closed, metallic, shell-like container of good thermal conductance, a solid member of metal having a high specific heat supported centrally within said container, a first heater winding wound on the surface of said solid member over a substantial portion thereof, a first temperature-sensitive resistor mounted on the surface of said solid member in good heat transfer relationship therewith, a second temperature-sensitive resistor mounted adjacent said solid member on the interior of said container in good heat transfer relationship therewith, a second heater winding wound on the exterior of said container over substantially the entire length thereof, and heat insulating material surrounding said solid member and the elements mounted thereon and operative to insulate thermally said solid member, said first resistor, and said first heater winding from the remainder of the elements of the unit.

No references cited.